Dec. 22, 1959 C. F. PULVARI 2,918,655

APPARATUS FOR RECORDING AND REPRODUCING DATA

Filed April 20, 1955 2 Sheets-Sheet 1

INVENTOR.
CHARLES F. PULVARI
BY
Brown, Schuyler & Beveridge
ATTORNEY

APPARATUS FOR RECORDING AND REPRODUCING DATA

Filed April 20, 1955 2 Sheets-Sheet 2

INVENTOR.
CHARLES F. PULVARI
BY
Brown, Schuyler & Beveridge
ATTORNEY

United States Patent Office 2,918,655

Patented Dec. 22, 1959

2,918,655

APPARATUS FOR RECORDING AND REPRODUCING DATA

Charles F. Pulvari, Washington, D.C.

Application April 20, 1955, Serial No. 502,653

22 Claims. (Cl. 340—173)

This invention relates to apparatus for recording and reproducing data such as bits of information and more particularly to such apparatus wherein ferroelectric material is utilized for information storage.

In my pending application Serial No. 145,361, filed February 21, 1950, now issued as U.S. Letters Patent No. 2,793,288, and in my pending application Serial No. 381,347, filed September 21, 1953, I disclose apparatus for recording and reproducing information wherein ferroelectric material is utilized for information storage. As disclosed in these applications, the ferroelectric material is preferably incorporated in a matrix having plural rows and plural columns whereby a plurality of cross points is provided. Each cross point comprises what can be described as a ferroelectric element capable of storing a bit of information.

When a matrix row or column includes a substantial number of ferroelectric elements there is always a substantial capacity in parallel to a particular element which is being selected for information storage at a particular moment. In fact, this parallel capacity becomes quite high if the matrix size is large. The rapidly advancing state of the art regarding ferroelectric elements is such that large size matrices may now be attained. Consequently, the problem of providing properly operative associated circuitry for writing information into such a matrix and reading the information from the matrix has become more acute. Satisfactory matrix operation requires high speed information input and output.

It is known in the art to provide ferroelectric storage circuits which employ associated information switching means such as transistors or the like which directly energize a ferroelectric storage matrix. Such circuitry is limited to a matrix where the number of ferroelectric elements in the matrix is relatively small or the speed at which the matrix is operated (speed of writing in information and reading out information) is relatively slow. As explained above, there is a substantial parallel capacitance in any given row or column of a matrix, said capacitance being due to the unselected elements in said row or column which are in parallel to a selected element. The high parallel capacitance tends to load down the switching means connected to the given row or column. In a large matrix, such a load causes an objectionable rise time and variation in the applied switching voltage. Also, the selected ferroelectric element itself is a strongly variable load inasmuch as the dielectric constant of the element changes from approximately 300 to 500,000 during the switching cycle. Such factors as these effectively limit, for practical purposes, the utilization of such circuits where the number of ferroelectric elements in a matrix may run into the thousands, for example.

It is therefore an object of the present invention to provide new and improved apparatus useful for recording and reproducing data such as bits of information wherein ferroelectric material is utilized for information storage and wherein the apparatus is capable of high speed operation despite the fact that the ferroelectric material may be disposed in a matrix arrangement of considerable size.

It is another object of the present invention to provide such apparatus including switching means wherein the impedance of the matrix is effectively matched to the impedance of the switching means despite the fact that the size of the matrix may be considerable.

It is a further object of the present invention to provide such apparatus wherein there is a more effective separation between the matrix and the matrix driving circuitry associated therewith.

It is still another object of the present invention to provide such apparatus wherein pulses of the same electrical sign may be utilized for both information recording and information reading.

It is a still further object of the present invention to provide such apparatus wherein matrix noise is reduced substantially.

Briefly described, a preferred embodiment of apparatus according to the teaching of the present invention comprises a ferroelectric storage matrix having a single slab or piece of ferroelectric material as the dielectric of a large number of ferroelectric elements or condensers, or having individual pieces of ferroelectric material each being the dielectric of a single ferroelectric element or condenser. The ferroelectric elements are preferably arranged in rows and columns wherein the elements in a given row or column have common electrodes, such a matrix arrangement being disclosed in my pending application Serial No. 145,361, filed February 21, 1950, now issued as U.S. Letters Patent No. 2,793,288.

Matrix driving circuitry associated with the ferroelectric storage matrix includes transformer means coupling the driving circuitry to the matrix. The transformer coupling is such that the matrix impedance is matched properly to the driving circuitry impedance said matching being effective despite the fact that a substantial number of ferroelectric elements may be connected in parallel in a given row or column of the matrix and despite the further fact that a ferroelectric element in said row selected for information switching undergoes a substantial change in dielectric constant during the switching cycle as described above. The transformer coupling provides, in addition to the mentioned impedance matching, effective separation of the matrix from the driving circuitry. Such separation, in turn, provides more convenient output circuitry.

The transformer providing such coupling is preferably provided with two primary coils having oppositely wound windings. With this arrangement it is possible to achieve the necessary pulse sign reversal for information writing and information reading. The entire matrix control circuitry is therefore simplified since it is unnecessary to provide any additional pulse sign reversal circuitry.

Other objects and advantages of the present invention will become more apparent from the following detailed description taken in conjunction with the attached drawings in which.

Figures 1, 4:
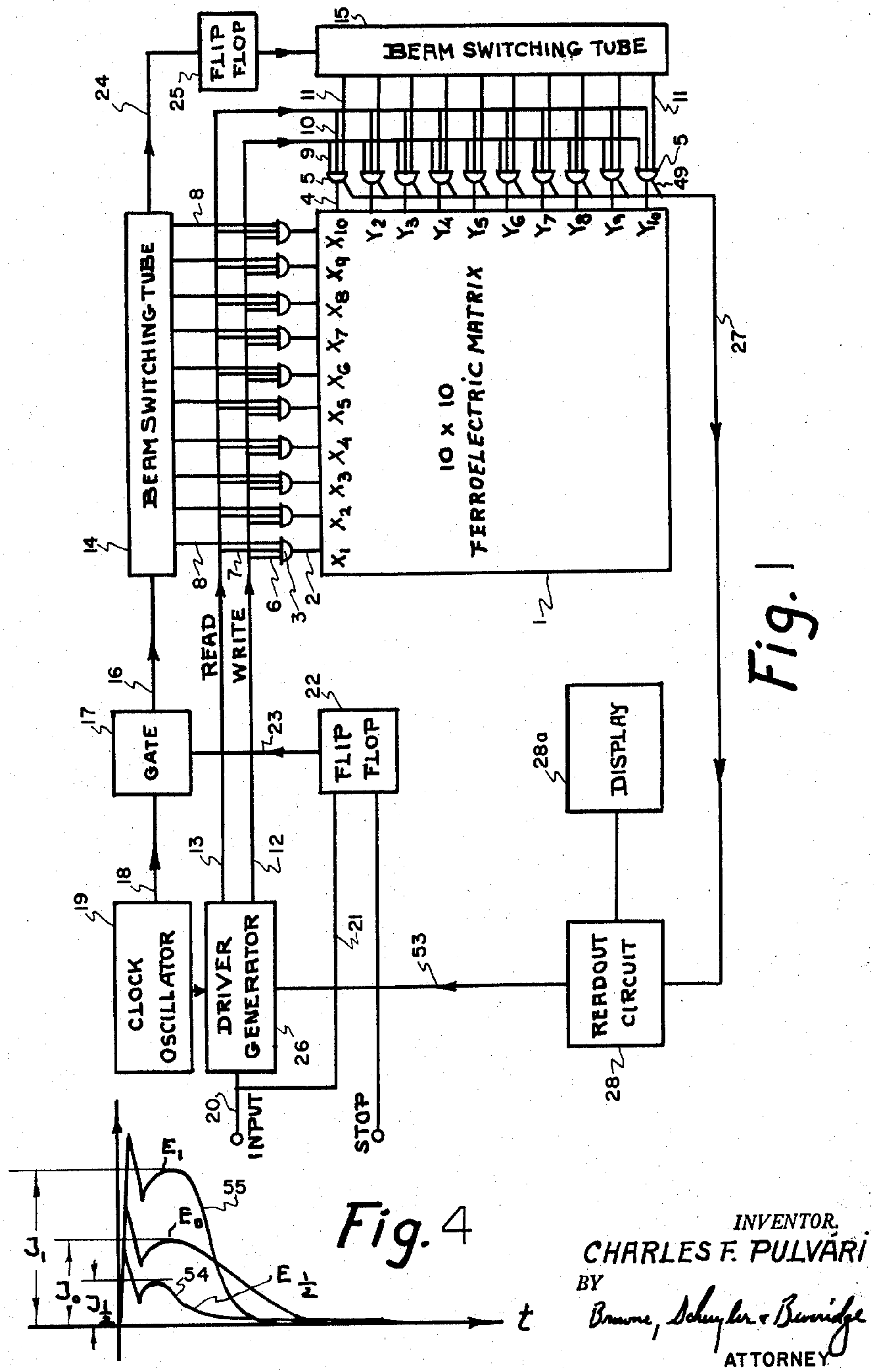
Fig. 1 is a block diagram showing apparatus according to the teaching of the present invention.
Fig. 4 shows switching transients occurring in a load resistance connected in series with a ferroelectric element.
Figure 2:
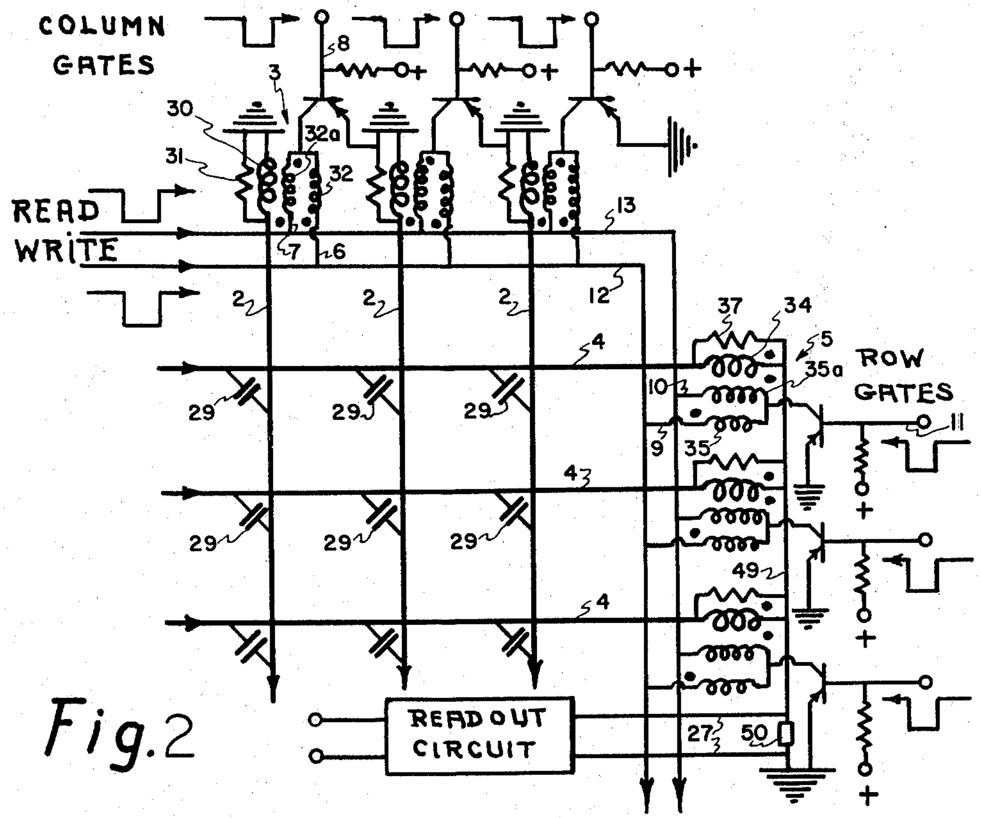
Fig. 2 is an enlarged detail view including a corner portion of the matrix shown in Fig. 1.

Referring to Figs. 1 and 2, block 1 designates ferroelectric elements disposed in a matrix arrangement. Preferably, the elements are located in columns $x$ and rows $y$. In order to conserve space, ten columns and ten rows are shown but this is to be understood as being merely illustrative since, as mentioned above, the teaching of the present invention makes practical the employment of matrices having a substantial number of columns and rows.

Each column *x* is fed by the output lead 2 of a coincidence (and) circuit 3. Similarly, each row *y* is fed by the output lead 4 of a coincidence (and) circuit 5. Each column circuit or gate 3 has three input leads 6, 7 and 8. Similarly, each row coincidence circuit or gate has three input leads 9, 10 and 11. Input leads 6, and 9 all connect to a common information input lead (a write lead) 12 while input leads 7 and 10 all connect to a common information readout lead 13. The third input lead to each column coincidence circuit 3 is an output lead of a beam switching tube designated by block 14. Similarly, the third input lead 11 to each row coincidence circuit 5 is an output lead of a beam switching tube designated by block 15.

Each beam switching tube is a type of tube known to those skilled in the art which is capable of stepping each time that an input pulse is applied to the tube so as to successively energize its output leads 8 and 11 in synchronism with the pulse timing of the pulses fed into it. Since a ten column and ten row matrix is shown as an example, each beam switching tube has ten output leads. Essentially, the beam switching tube is a cathode-beam tube similar to those shown in my pending application Serial No. 145,361, filed February 21, 1950, now issued as U.S. Letters Patent No. 2,793,288, but has the additional feature that the cathode-beam can be locked in ten stable positions. Inasmuch as a beam switching tube of the type described is known to those skilled in the art, further detailed description thereof is considered unnecessary.

Beam switching tube 14 is connected by a lead 16 to a gate designated by block 17. In turn, gate 17 is connected by a lead 18 to a master oscillator 19. An information input lead 20 has a lead 21 which feeds into a flipflop designated by block 22. The flipflop output proceeds via lead 23 to gate 17. The characteristics of flipflop 22 are such that an input signal fed thereto may, if the flipflop is properly set, proceed via lead 23 to energize gate 17 and permit a pulse from master oscillator 19 to proceed into beam switching tube 14 via lead 16.

In practice, master oscillator 19 is energized to deliver uniformly spaced apart pulses at whatever practicable frequency is chosen. For example, oscillator 19 may be operated at one megacycle whereby it delivers a pulse every microsecond. When oscillator 19 is operating, the matrix scanning operation may be initiated by actuating gate 17 as above described so that a pulse from the oscillator is synchronized with a pulse fed into gate 17 on lead 23. This of course synchronizes the oscillator pulses with pulses appearing on either lead 12 or 13. As is understood by those skilled in the art, as pulses proceed from oscillator 19 to the ten position beam switching tube 14, the beam therein proceeds one position for each successive pulse until ten steps have been accomplished in the tube, the ten steps resulting in successive energization of the tube output leads 8. The trailing edge of the pulse from the tenth output lead 8 proceeds via lead 24 to trigger a flipflop designated by block 25.

When flipflop 25 is triggered it proceeds to drive the row scanner beam switching tube 15 which steps in the manner described above to successively energize leads 11. Also, as flipflop 25 is triggered, beam switching tube 14 is reset whereupon it repeats its stepping, starting with the first column position in the manner described above. In this way, each column coincidence (and) circuit 3 and each row coincidence (and) circuit 5 is fed by its associated beam switching tube in a synchronized manner to provide a scanning input to matrix 1.

To write information into matrix 1, trigger pulses representing the information to be stored are applied to information input lead 20 which feeds into a driver generator designated by block 26. The characteristics of driver generator 26 are such that it generates pulses of the same electrical sign on write lead 12. As an example, it is assumed that minus V/2 pulses are thus generated and appear on write lead 12. The pulse pattern, i.e. pulse spacing, will determine when a minus V/2 pulse will coincide with energization of a lead 8 feeding into a column coincidence circuit 3. However, when such coincidence does occur a minus V/2 voltage appears on the selected column lead 2 and a plus V/2 voltage appears on the selected row lead 4. It will be recalled that the row coincidence (and) circuits are likewise fed from write lead 12 and consequently the minus V/2 input pulse can coincide with an energized beam tube output lead 11. However, as explained more in detail hereinafter, output leads 4 will have a plus V/2 voltage when leads 2 have a minus V/2 voltage appearing thereon. Coincidence circuits 3 and 5 may be referred to as gated bidirectional (and) circuits since the circuit output lead is energized upon the coincidence of two input signals even though each circuit has three input leads.

When information stored in matrix 1 is to be read out, driver generator 26 is triggered by master oscillator 19. When this occurs, the characteristics of the driving generator are such that it produces minus V/2 pulses on read lead 13. Since leads 7 and 10 connect to read lead 13, the minus V/2 pulses are applied as input pulses to the coincidence circuits 3 and 5. When these input pulses coincide with an energized beam switching tube output lead 8 and 11, respectively, then the respective coincidence circuit 3 or coincidence circuit 5 involved will be energized to apply a voltage to a particular column or row lead. Thus, where such coincidence occurs, i.e. the coincidence of a pulse on lead 13 with an energized beam switching tube output lead such as leads 8 and 11, the column coincidence circuit 3 involved energizes a column lead 2 to apply a plus V/2 voltage to the selected column and, correspondingly, a minus V/2 voltage is applied to the selected row. This is just the reverse of what occurs when information is written into matrix 1. It is therefore apparent that when a "1" is written into matrix 1, a pulse having a voltage magnitude which can be described as minus V is applied to the selected ferroelectric element whereas, when a "1" is read out of the matrix, a plus V voltage is applied to the selected ferroelectric element. As is explained in greater detail hereinafter, the information read out of matrix 1 proceeds via lead 27 to a readout circuit designated by block 28. As desired, the readout information may then be fed to any suitable output means such as is indicated by block **28*a*. The readout information may also be used to restore information in selected cross points. This is accomplished via lead 53 which feeds into driver generator 26. The latter energizes write lead 12** which transmits the restoring pulses to selected cross points as will be understood by those skilled in the art.

Figure 3:
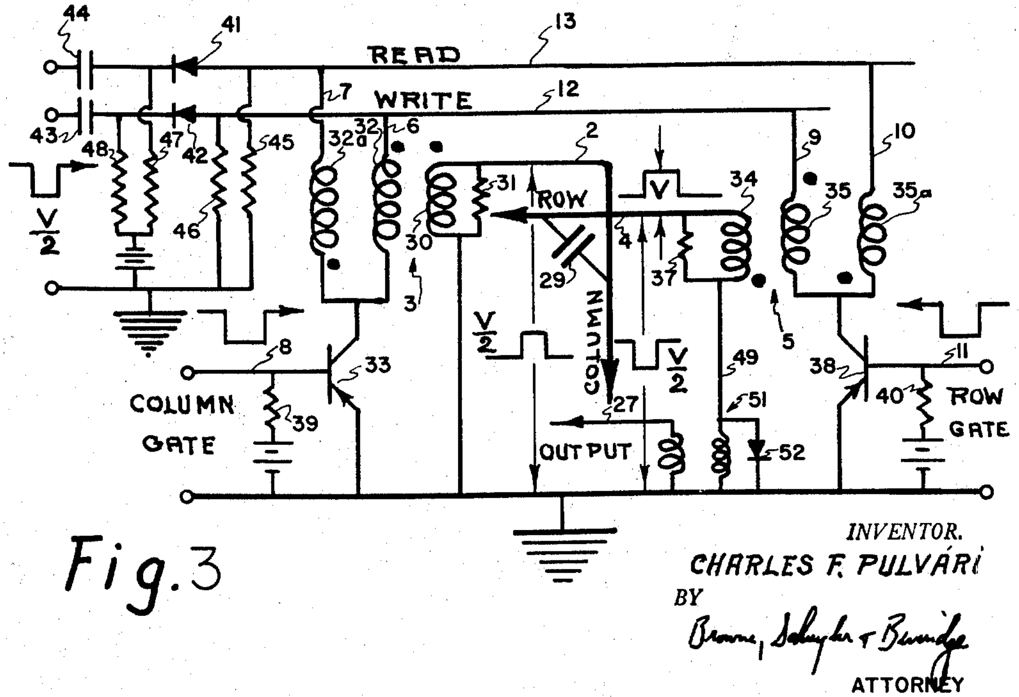
Fig. 3 shows a single ferroelectric element and circuitry associated therewith according to the teaching of the present invention.

Referring now more particularly to Figs. 2 and 3, it is noted that Fig. 2 shows three column coincidence circuits 3, three row coincidence circuits 5, and portions of three column leads 2 and three row leads 4. At each location where a column lead crosses a row lead there is what may be designated as a cross point of the matrix, said cross point being provided with a ferroelectric element 29 as shown in Fig. 2. As previously mentioned, the ferroelectric dielectric may be a single slab separating the column leads and the row leads or may be small bits of ferroelectric material disposed between the column leads and the row leads at the cross point locations. Since each cross point and the circuitry associated therewith is the same, reference is now made to Fig. 3 which shows one such cross point.

Fig. 3 shows a ferroelectric element designated by the reference numeral 29 as being located between a column lead 2 and a row lead 4. The ferroelectric element comprises a dielectric of ferroelectric material such as barium titanate and is in the nature of a condenser having such a dielectric, it being understood that the dielectric is located between the column lead 2 and the row lead 4 at each location where these respective leads cross each other. Column lead 2 and row lead 4 can therefore be described as being electrodes connected on opposite sides of the condenser element 29 which has a ferroelectric dielectric. As is brought out fully in my pending application Serial No. 145,361, filed February 21, 1950, now issued as U.S. Letters Patent No. 2,793,288, and in my pending application Serial No. 381,347 now Patent No. 2,884,617, filed September 21, 1953, information is stored in ferroelectric element 29 by polarizing the element in one direction and the stored information can be readout of the element by applying a voltage pulse of opposite electrical sign from the pulse which stored the information, said opposite electrical sign readout pulse reversing the polarization of the ferroelectric element which thereupon produces an output pulse or signal. Switching circuitry for driving a matrix must therefore be capable of applying the necessary opposite sign pulses for accomplishing writing and reading of information.

Referring back to Fig. 3, it is noted that column lead 2 is connected in series with a transformer secondary winding 30 which is shunted by a resistance 31. The transformer has primary windings 32 and 32*a* which, as is indicated by the black dots appearing at one end of each winding, are wound oppositely with respect to each other. With such opposite winding, it is evident that when one of the two primary windings is energized it will induce a voltage in the secondary 30 of opposite polarity from the voltage induced by the other primary winding, assuming, of course that the energizing voltage has the same electrical sign in both instances. This means that pulse sign reversal may be obtained in secondary 30 by a writing pulse and a reading pulse of the same electrical sign.

Transformer windings 30, 32 and 32*a* are collectively part of the coincidence circuit 3 of which each column lead 2 is an output lead as shown in Fig. 1. The transformer primary windings 32 and 32*a* are connected through a transistor 33 to ground, the transistor thus also being a part of coincidence (and) circuit 3. It is noted that primary windings 32 and 32*a* are fed by coincidence circuit input leads 6 and 7 respectively, these leads, of course, being connected to write lead 12 and read lead 13 respectively. Coincidence circuit input lead 8, an output lead of beam switching tube 14, feeds to the base of transistor 33 as shown in Fig. 3. As will be apparent to those skilled in the art, each transformer primary winding 32 and 32*a* may be connected to ground through a separate transistor 33 connected in series with the primary winding. In this arrangement, coincidence circuit input lead 8 will feed to the base of each separate transistor 33.

Coincidence (and) circuit 5, of which each row lead 4 is an output lead, includes the same components as described above with reference to coincidence circuit 3. Thus, referring to Figs. 2 and 3, it is noted that circuit 5 includes a transformer secondary 34 and a pair of transformer primary windings 35 and 35*a*. Primary windings 35 and 35*a* are wound oppositely as indicated by the black dots at an end of each of these windings and it is observed that the direction of winding corresponds to the direction of winding for the corresponding primary windings in coincidence circuit 3. Secondary winding 34 is, however, wound oppositely to secondary 30 of coincidence gate 3. This secondary winding 34 is shunted by a resistance 37 corresponding to resistance 31 which shunts secondary winding 30. The primary windings 35 and 35*a* of circuit 5 are connected through transistor 38 to ground, the base of this transistor being fed by coincidence circuit input lead 11 which is an output lead of beam switching tube 15. As will be apparent to those skilled in the art, each primary winding 35 and 35*a* may be connected to ground through a separate transistor 38 connected in series with the primary winding. In this arrangement, the coincidence circuit input lead 11 will feed to the base of each separate transistor 38.

When the circuitry shown in Fig. 3 is in what can be termed standby condition, the bases of transistors 33 and 38 are biased through resistances 39 and 40 as shown in Fig. 3 so that both transistors present an extremely high impedance to ground and hence can be considered as being cut off. When, however, an input lead 8 or 11 is energized by its associated beam switching tube, the transistor involved becomes conductive between collector and emitter and the selected gate or coincidence circuit 3 or 5 may be considered as being in on position. In other words, as the respective beam switching tubes step along to energize their output leads in succession, each coincidence circuit fed by such a lead is successively in on position when the beam switching tube energizes the lead feeding thereto. Therefore, since each coincidence circuit is what can be termed a bi-directional gate circuit, writing or reading can occur if either of input leads 6 or 7 or leads 9 or 10 is properly energized when the associated gate circuit is in on position.

Assuming that a minus V/2 pulse is applied to write lead 12 and further assuming that each gate circuit 3 and 5 shown in Fig. 3 is in one position as described above, then data such as a bit of information may be written into or stored in ferroelectric element 29. The minus V/2 pulse energizes transformer primary winding 32 connected to write lead 12 inducing a plus V/2 voltage in transformer secondary 30. Simultaneously, the minus V/2 pulse energizes transformer primary winding 35 of coincidence circuit 5 to induce a voltage in transformer secondary winding 34 coupled thereto. However, the direction of winding of transformer secondary 34 is such that the induced voltage appears as a minus V/2 voltage with reference to ferroelectric element 29. Ferroelectric element 29 thus has a voltage of magnitude V applied thereto and this polarizes the ferroelectric dielectric so as to store a bit of information, or a 1, in the element.

Assuming that a minus V/2 pulse is subsequently applied to read lead 13, it is evident that since the primary windings fed by this lead are wound oppositely to the primary windings fed by lead 12, the voltages induced in the transformer secondaries are of opposite polarity to the voltages so induced when the information was written into the ferroelectric element 29. Thus, a plus V/2 voltage is induced in secondary winding 30 and a minus V/2 voltage induced in secondary winding 34. This again results in a voltage of magnitude V applied to the selected ferroelectric element but this voltage has a polarity opposite to the voltage which wrote the bit of information into the element. The ferroelectric element is thus reversed in polarization which results in an output pulse from the element. The bit of information is therefore readout of the element.

During the writing of information into a selected ferroelectric element and also during the reading of information from such an element, the primary windings 32 and 32*a* of coincidence circuit 3 and, correspondingly, the primary windings 35 and 35*a* of coincidence circuit 5, are prevented from interfering, interacting, with each other by diodes 41 and 42 which effectively separate the primary windings. As is shown in Fig. 3, an input pulse to either the write lead 12 or the read lead 13 proceeds through a condenser and then through a diode to the lead involved. Thus, assuming a minus V/2 input pulse to lead 12, this pulse proceeds through condenser 43 and diode 42 to lead 12. Similarly, such a pulse fed to read lead 13 proceeds through condenser 44 and diode 41 to lead 13.

Assuming that a minus V/2 write pulse is being applied to write lead 12, as described above, this minus V/2 pulse energizes primary winding 32 of coincidence circuit 3 since it is assumed that transistor 33 is conductive. When primary winding 32 is energized it does induce an opposite polarity pulse in the other primary winding 32*a* associated therewith which is also in series with the conductive transistor 33. However, diode 41 is nonconductive for the pulse induced in primary winding 32*a* (due to the polarity of this pulse) and therefore most of the induced pulse is dissipated in resistor 45. Similar action occurs with respect to any such pulse induced in primary winding 35*a* of coincidence circuit 5 and it is therefore apparent that the unwanted voltage induced in the unselected primary winding of the pair of primary windings of each gate circuit produces a negligible effect. Resistances 46, 47 and 48 are resistors which complete the circuit to ground as shown in Fig. 3 with respect to diodes 41 and 42 and write lead 12, resistor 45 of course completing such a circuit to ground for read lead 13.

Resistances 31 and 37 which shunt transformer secondary windings 30 and 34 respectively perform the important function of damping and stabilizing the impedance of the transformer circuitry of which they are a part. The value of each resistance is critical in the sense that the resistance has to be sufficiently low so as to accomplish damping out of ringing effects which would otherwise appear. Assuming that the pulse transformer has a ratio 3:1 and the pulse source impedance of the driver generator is approximately 75 ohms, then each resistance 31 or 37 should be in the range from 20 to 70 ohms.

When information is read out of a selected ferroelectric element 29 as described above, the signal or pulse representing the information appears on an output lead 49 of each coincidence (and) circuit 5 as shown in Figs. 1–3. The output leads 49 may all feed to a common load impedance 50 as shown in Fig. 2 or a common output transformer 51 the primary winding of which is shunted by a diode 52 as shown in Fig. 3. In either case, the voltage appearing across the common load impedance 50 or across the secondary winding of transformer 51 is applied to readout circuit 28 via leads 27. Such readout circuits are described in greater detail in my pending application Serial No. 381,347, filed September 21, 1953. The important consideration in these readout circuits is to obtain a separation of the readout pulse from its accompanying switching transient so as to obtain a better signal to noise ratio.

As is described more fully in my pending application Serial No. 381,347, filed September 21, 1953, an elastic transient appears on a common output load impedance such as impedance 50 shown in Fig. 2 when a selected ferroelectric element is switched in its polarization to readout a bit of information. The transient occurs not only with respect to the selected ferroelectric element but also, because of a reduced excitation, with respect to the unselected ferroelectric elements which are connected in parallel to the selected ferroelectric element. The undesired transients which appear on the common load impedance 50 during information readout produce what is usually called matrix noise. However, in accordance with a further teaching of the present invention, such matrix noise can be substantially completely or at least partially compensated by producing a similar matrix noise of opposite electrical sign.

To accomplish this, the write lead 12 is energized simultaneously with the energizing of read lead 13 for information readout. Thus, referring to Fig. 1, when clock oscillator 19 energizes driver generator 26 during information readout, the circuitry of the driver generator is such (as will be understood by those skilled in the art) that a compensating pulse is applied to write lead 12 which does not exceed one-third of the magnitude of the readout pulse applied to read lead 13. In other words, the compensating pulse should be sufficient only to cause an elastic transient of the type shown by curve 54 in Fig. 4 which is only a fraction of the switching transient 55. Of course, the compensating transient must have an opposite electrical sign to the transient produced during readout. Therefore, when the readout pulse appearing on read lead 13 does effect a reading out of information from a selected ferroelectric element as described above, a switching transient is also produced due to the reversal of polarization of the selected ferroelectric element. Simultaneously, elastic transients not exceeding one-half the magnitude of the elastic transient produced by switching the selected ferroelectric element are produced by ferroelectric elements connected to the same row and to the same column forming the cross point at which the selected ferroelectric element is located.

All of the elastic transients accumulate on the common load impedance 50, or transformer 51 if a transformer is used as the common load impedance. However, also simultaneously, the compensating pulse appearing on write lead 12 produces elastic transients of substantially one-half the magnitude of and of opposite electrical sign to the elastic transient produced by the readout pulse. Also simultaneously, the compensating pulse produces what can be termed one-quarter elastic transients of opposite sign on the unselected ferroelectric elements which are connected to the same row and column of which the selected ferroelectric element is a cross point. The end result is that all of the transients come together in the common load impedance, the transients produced by the compensating pulse cancelling out a substantial part of the transients produced by the readout pulse. The result is a considerable increase in the signal to noise ratio of the matrix and hence improved ferroelectric circuitry performance.

If total compensation of the matrix noise is desired, a separate and second scanner may be provided which is capable of producing compensating pulses of proper magnitude on the unselected ferroelectric elements only. The manner in which this may be accomplished is the same as has been described above in connection with the circuitry shown in Fig. 1. Accordingly, it is deemed unnecessary to go into further detail since it is considered that, in view of the teaching of the present invention, the circuitry and operation needed to achieve total compensation will be apparent to those skilled in the art.

It will be appreciated by those skilled in the art that the type of scanning described above, utilizing beam switching tubes such as tubes 14 and 15, is a sequential scanning arrangement. However, a random scanning arrangement may be used in lieu of a sequential scanning arrangement without departing from the teaching of the present invention. As is known to those skilled in the art, a random scanning arrangement works on the principle that a larger number of leads may be controlled by a smaller number of input leads where binary or ternary signals are simultaneously applied to the input control leads. Such a random scanning arrangement is shown and described in my pending application Serial No. 381,347, filed September 21, 1953. In utilizing a random scanner in place of the sequential scanner shown in Fig. 1 which includes beam switching tubes 14 and 15, the random scanner output leads will of course replace output leads 8 and 11 shown in Fig. 1. As will be appreciated by those skilled in the art, an advantage of utilizing random scanning means is that substantially instantaneous access may be had to any information stored in the matrix since it is unnecessary to wait for sequential stepping as occurs with a beam switching tube, for example.

For recording and reproducing coded information, it may be desirable to use a combination of sequential scanning with random scanning. Sequential and random scanning arrangements can be combined so that the coincidence (and) circuits 3 and 5 may be driven simultaneously, or in any desired time sequence, to permit a complete coding of information being recorded. Therefore, if information is written into a ferroelectric matrix in coded fashion by utilizing a combined sequential and random scanning means to effect the writing in of the information according to the code chosen, the information can later be decoded by using the same combined scanning means and utilizing the same code for reading as was used for writing. Very effective coding of information can be obtained in this fashion and the coding goes far beyond the mere scrambling of information.

It is seen therefore that the present invention provides apparatus for recording and reproducing data such as bits of information which is capable of high speed operation, in the megacycle range for example, despite the fact that a great number of ferroelectric elements may be present in the information storage matrix. By utilizing transformer coupling according to the teaching of the present invention to couple the scanning and write or read leads to the matrix leads, the impedance of the matrix involved is matched properly with the impedance of the matrix driving circuitry. Also, such transformer coupling provides more effective separation between the driving circuitry and the matrix. A further distinct advantage of such transformer coupling, as described and illustrated herein, is that the necessary pulse sign reversal for proper information writing and information reading is obtained by the coupling means. This simplifies considerably the control circuitry for driving the matrix since it is unnecessary to provide separate means for achieving such pulse sign reversal. It is found that apparatus according to the present invention makes practicable the utilization of ferroelectric matrices having a substantial number of ferroelectric elements therein, thousands of such elements, for example.

While I have described and illustrated embodiments of my invention I wish it to be understood that I do not intend to be restricted solely thereto but that I do intend to cover all modifications thereof which would be apparent to one skilled in the art and which come within the spirit and scope of my invention.

What I claim as my invention is:

1. A ferroelectric matrix system comprising a ferroelectric matrix, matrix driving circuitry, and inductance means coupling said driving circuitry electrically to said ferro-electric matrix to transmit matrix driving electrical energy from said driving circuitry through said inductance means to said matrix, said inductance means substantially matching the impedance of said driving circuitry to the impedance of said ferroelectric matrix, and said inductance means being adapted to be switched to feed signals to a common external load circuit.

2. A ferroelectric matrix system comprising a plurality of ferroelectric elements arranged in a matrix having plural rows and plural columns, said plural rows and plural columns defining a plurality of cross points, there being a ferroelectric element located at each cross point whereby each row and each column has a plurality of ferroelectric elements connected thereto, matrix driving circuitry, and pulse reversible inductance means electrically connecting said driving circuitry to each row and each column of said ferroelectric matrix to transmit matrix driving electrical energy from said driving circuitry through said inductance means to said matrix.

3. A ferroelectric matrix system comprising a ferroelectric matrix having a plurality of matrix leads, matrix driving circuitry including an information writing lead and an information reading lead, and a plurality of pulse transformers, there being a pulse transformer associated with each matrix lead, each pulse transformer including a double primary winding and a single secondary winding, said secondary winding being electrically connected to the matrix lead with which said pulse transformer is associated, one of said double primary windings being directly electrically connected to said information writing lead and the other of said double primary windings being directly electrically connected to said information reading lead to transmit matrix driving electrical energy from said matrix driving circuitry through said primary windings to said matrix.

4. A system according to claim 3 wherein each transformer primary double winding comprises two windings wound oppositely with respect to each other whereby a pulse of one electrical sign is produced in the transformer secondary when one of the primary windings is energized and a pulse of opposite electrical sign is produced in the transformer secondary when the other transformer primary winding is energized.

5. A system according to claim 3 wherein transformer secondary windings connected to some of said matrix leads are wound oppositely with respect to transformer secondary windings connected to others of said matrix leads.

6. A ferroelectric matrix system comprising a ferroelectric matrix having a plurality of matrix leads, a plurality of coincidence circuits, there being a coincidence circuit connected to each matrix lead, scanning means, normally high impedance means electrically connecting said scanning means to each coincidence circuit, matrix element selector means also connected to each coincidence circuit, and means to change said normally high impedance means to a low impedance means in response to a signal from said scanning means, each coincidence circuit being energized in response to a coincidence of signals from said scanning means and said matrix element selector means to energize the matrix lead connected to said coincidence circuit.

7. A system according to claim 6 wherein said impedance means is a transistor.

8. A ferroelectric matrix system comprising a ferroelectric matrix having a plurality of matrix leads, matrix driving circuitry including a matrix driving lead common to each of said matrix leads, a plurality of pulse transformers directly electrically connected to said driving lead and coupling said driving circuitry to said ferroelectric matrix to transmit matrix driving electrical energy from said matrix driving circuitry through said pulse transformers to said matrix, there being a pulse transformer connected to each matrix lead, and scanning means electrically connected to each pulse transformer.

9. A system according to claim 8 wherein said scanning means is a sequential scanning means.

10. A system according to claim 8 wherein said scanning means is a random scanning means.

11. A system according to claim 8 wherein said scanning means is a combined sequential and random scanning means.

12. A ferroelectric matrix system comprising a ferroelectric matrix having a plurality of matrix leads, matrix driving circuitry including an information writing lead and an information reading lead, a plurality of pulse transformers coupling said driving circuitry to said ferroelectric matrix, there being a pulse transformer connected to each matrix lead, each pulse transformer having two primary windings ad a secondary winding, one of said primary windings being directly electrically connected to said information writing lead and the other of said primary windings being directly electrically connected to said information reading lead, output circuitry connected to each transformer secondary, and means electrically connecting said output circuitry to said matrix driving circuitry to energize the two primary windings of each transformer sequentially in response to the output signal or signals produced in said output circuitry, said sequential energization being effective to reduce matrix noise substantially.

13. A ferroelectric matrix system comprising a ferroelectric matrix having a plurality of matrix leads, matrix driving circuitry including an information writing lead and an information reading lead each common to said matrix leads, a plurality of pulse transformers coupling said driving circuitry to said ferroelectric matrix, there being a pulse transformer connected to each matrix lead, each pulse transformer having two primary windings and a secondary winding, one of said primary windings being directly electrically connected to said information writing lead and the other of said primary windings being directly electrically connected to said information reading lead output circuitry connected to each transformer secondary winding, and means electrically connecting said output circuitry to said matrix driving circuitry to energize the two primary windings of each transformer simultaneously, one of said primary windings being energized with electrical pulses of one amplitude and the other of said primary windings being energized with electrical pulses of a different amplitude.

14. A ferroelectric matrix system comprising a ferroelectric matrix having a plurality of matrix leads, matrix driving circuitry including a driver lead common to said matrix leads, a plurality of pulse transformers coupling said driving circuitry to said ferroelectric matrix, each pulse transformer having a secondary winding connected to a matrix lead, means connecting one end of each transformer primary to said driver lead, gating means electrically connected to the other end of each transformer primary, and means to energize said gating means to energize said transformer primary.

15. Apparatus useful for recording and reproducing data such as bits of information, said apparatus comprising a ferroelectric element having a pair of electrodes, inductance means connected in series with each electrode, and a driver lead directly electrically connected to each of said inductance means to energize said inductance means to apply voltage to said ferroelectric element in one direction or the other depending upon whether information is being recorded in said element or being reproduced from said element, the inductance means connected in series with one of said electrodes forming part of an external load circuit for said ferroelectric element.

16. Apparatus useful for recording and reproducing data such as bits of information, said apparatus comprising a ferroelectric element having a pair of electrodes, a transformer secondary winding connected in series with each electrode, a resistance connected electrically in parallel with each transformer secondary winding, a driver lead, and a transformer primary connected directly to said driver lead to energize each transformer secondary winding to apply voltage to said ferroelectric element in one direction or the other depending upon whether information is being recorded in said element or being reproduced from said element, the transformer secondary winding connected in series with one electrode and the resistance in parallel with said winding forming part of an external load circuit for said ferroelectric element.

17. Apparatus useful for recording and reproducing data such as bits of information, said apparatus comprising a ferroelectric element having a pair of electrodes, a pair of transformer secondary windings oppositely wound with respect to each other, one of said secondary windings being connected in series with one of said electrodes and the other of said secondary windings being connected in series with the other of said electrodes, a pair of oppositely wound transformer primary windings associated with each transformer secondary winding, and driver circuit leads directly electrically connected to each pair of transformer primary windings to energize one or the other of said primary windings whereby opposite polarity electrical pulses may be produced in said transformer secondary windings to produce a resultant voltage of one polarity across said ferroelectric element for recording information in said element and to produce a resultant voltage of opposite polarity across said ferroelectric element for reproducing information from said element.

18. Apparatus useful for recording and reproducing data such as bits of information, said apparatus comprising a ferroelectric element having a pair of electrodes, a pair of pulse transformers, each transformer including a primary having a pair of oppositely wound windings and also including a secondary winding, one of said secondary windings being connected electrically in series with one of said ferroelectric element electrodes and the other of said transformer secondary windings being connected electrically in series with the other of said ferroelectric element electrodes, and a pair of driver leads, one of said driver leads being directly electrically connected to the corespondingly wound windings of each pair of transformer primary windings and the other driver lead being directly electrically connected to the correspondingly oppositely wound windings of each pair of transformer primary windings to energize one or the other of said primary windings to produce an electrical pulse of one polarity or of opposite polarity in the secondary winding forming a part of said transformer whereby a voltage may be produced across said ferroelectric element having a magnitude which is the sum of the magnitudes of the pulses produced in said transformer secondaries.

19. Apparatus useful for recording and reproducing data such as bits of information, said apparatus comprising a ferroelectric element having a pair of electrodes, inductance means connected in series with one of said electrodes, and a driver lead directly electrically connected to said inductance means to energize said inductance means to apply voltage to said ferroelectric element in one direction or the other depending upon whether information is being recorded in said element or being reproduced from said element, said inductance means forming part of an external load circuit for said ferroelectric element.

20. A ferroelectric matrix system comprising a ferroelectric matrix, matrix driving circuitry, inductance means electrically connecting said driving circuitry to said ferroelectric matrix to transmit matrix driving electrical energy from said driving circuitry through said inductance means to said ferroelectric matrix, and a load circuit connected to said matrix through said inductance means.

21. A ferroelectric matrix system comprising a ferroelectric matrix having a plurality of matrix leads, matrix driving circuitry including a matrix driving lead common to all of said matrix leads, and a pulse transformer connected directly to said matrix driving lead and coupling said driving circuitry to each matrix lead to transmit matrix driving electrical energy from said driving circuitry through said pulse transformer to each matrix lead as desired.

22. A system according to claim 21 wherein said pulse transformer includes a transformer secondary having a resistance connected electrically in parallel with said transformer secondary to damp and stabilize the impedance of said pulse transformer.

References Cited in the file of this patent

UNITED STATES PATENTS

| | | |
|---|---|---|
| 2,691,154 | Rajchman | Oct. 5, 1954 |
| 2,691,157 | Stuart-Williams et al. | Oct. 5, 1954 |
| 2,719,965 | Person | Oct. 5, 1954 |
| 2,785,390 | Rajchman | Mar. 12, 1957 |

OTHER REFERENCES

Publication, "Ferroelectric For Digital Information Storage and Switching," by Dudley Allen Buck, MIT Digital Computer Laboratory, June 5, 1952, p. 24, Fig. 25c.

"Unlabeled Food Cans," Electronics, September 1952, vol. 25, issue 9, pp. 101–105.

"New Ferrite-Core Memory Uses Pulse Transformers" (Papian), Electronics, March 1955, pp. 194–197.